United States Patent Office 3,552,898
Patented Jan. 5, 1971

3,552,898
METHOD OF JOINING METAL PARTS

Jack Raymond Bird, Derby, Douglas Wilson Hall, Shirley, near Ashbourne, and Peter William John Bye, Derby, England, assignors to Rolls Royce Limited, Derby, England, a British company No Drawing. Continuation-in-part of application Ser. No. 329,224, Dec. 9, 1963. This application Apr. 1, 1968, Ser. No. 717,892
Int. Cl. B23k *31/02, 35/38*
U.S. Cl. 29—494 13 Claims

ABSTRACT OF THE DISCLOSURE

Nickel base alloy parts are diffusion bonded together by heat treating the parts in vacuum at a temperature within 100° C. of the solidus temperature, placing the parts in direct contact with each other and heating the parts to a temperature which is below the solidus temperature without the application of external pressure.

This application is a continuation-in-part of Ser. No. 329,224, filed Dec. 9, 1963 now abandoned.

This invention relates to a method of joining together two or more nickel base alloy parts, the alloys being the same or different.

Broadly stated, the method of the present invention comprises forming flat or curved mating faces on the nickel base alloy parts, bringing the parts together so that the flat or curved mating faces are in contact, and subjecting the parts to a temperature which is below the solidus temperature of the alloy or alloys involved without the application of external pressure, for a long enough period of time to ensure that a permanent bond is formed between the two parts by solid state diffusion alone.

According to a more specific aspect of the invention, it is proposed to join together two nickel base alloy parts by a method which involves machining or otherwise forming flat or curved mating surfaces on the two parts, bringing the flat or curved mating surfaces into contact, without the application of external pressure, and maintaining the temperature of the two parts between S −½° C. and S—15° C. (where S is the solidus temperature of the two parts or of an alloy formed from the two parts) for a length of time (e.g., 2–24 hours) such as to result in a permanent bond being formed between the two parts by solid state diffusion only.

Methods of joining with external pressure are cumbersome and difficult to apply in quantity mass production apart from the distortion which occurs at the mating faces which destroys the accuracy of the hole or slots position. This difficulty is obviated by the present invention which is particularly applicable to turbine blades for gas turbine engines having cooling passages formed in them. Owing to the aerofoil shape of the turbine blade the size and number of the desirable air passages for maximum efficiency of cooling are limited by the existing methods used to fabricate them in the aerofoil, for example, by preformed extrusion, by tedious drilling or by electro-machining of the holes. In addition, the development of high temperature nickel base alloys to meet the stress/temperature conditions in the gas turbine has made it more and more difficult to machine or electro-form very small passages through the overall length of the blade and at the same time to conform with the desired accuracy and relative positions required and only relatively simple designs are possible.

One object of the present invention as applied to gas turbine blades is to overcome the mechanical problem of forming the passages. According to the invention, as applied to gas turbine blades, shaped slots are formed (by any of the well-known methods) in a surface of at least one part of a forging or blade made of nickel base alloy, the surface or surfaces being chosen in the part to coincide with the position where passages are required internally in the finished blade, then mating the surface of the part containing the shaped slots with the corresponding surface of another nickel base alloy part so that the two parts are in direct contact with each other and joining the parts into a single piece by maintaining the parts in direct contact at a temperature between S −½° C. and S −15° C. for a sufficient time to join the parts by solid state diffusion only.

Preferably the metallic parts to be joined are subjected to heat treatment in vacuum prior to the joining process. The heat treatment preferably consists of heating the individual parts to be joined for between 15 and 60 minutes at a temperature which has to be predetermined for the alloy but is within 100° C. of the solidus temperature of the metal or alloy from which the parts are made. The heat treatment is preferably carried out in a vacuum furnace at a pressure of less than $5\times10^{-5}$ torr.

The slots may, if desired, be formed in both the mating parts. These slots may be formed by machining, casting, drilling, electroforming or in any other well-known way.

The time for the solid state diffusion bonding is preferably within the range 2 to 24 hours, and will depend on the materials and the temperature employed.

The diffusion process is preferably carried out in a vacuum furnace.

The number of sections is unlimited but it has been found that the mating surfaces must be in good contact, or fit, for diffusion to take place.

Sections machined to form the final unit may, if desired, be made from alloys of different compositions although it is preferable that the base metal be the same.

It is also desirable that the two faces to be joined should have a similar direction when made from forged or worked alloys but in the case of cast material this is not found to be critical or even necessary.

After diffusion and joining is completed the part may be finished by shaping, controlled forging, or coining or by direct machining to produce the final external form.

Alternatively, the individual sections of the part may be formed by powder metallurgy methods, for example, by pressing each of the sections in dies to form the required cooling passages and then sintering. The two or more parts are then joined by diffusion to form a unit suitable for a blade; or, simple blocks may be pressed, sintered, machined to form the coolant passages and finally joined by solid state diffusion to form the unit.

The invention covers the use of any nickel base alloy or combination thereof, but is particularly applicable to high temperature nickel base alloys to be used as blades for gas turbine engines. Such alloys usually have a solidus temperature in the range of about 1200 to 1320° C. and will generally include at least about 50% nickel (e.g., 50–75% nickel) with chromium, aluminum and titanium each present in amounts ranging from about 3–12%, percentages being by weight. Other additives such as cobat, molybdenum and/or zirconium in varying amounts, e.g., about 0.1% to about 10% may also be present, usually along with minor amounts (of the order of less than 0.5%) of carbon and/or boron or the like. The invention is particularly applicable to the so-called nimonic series of alloys. Examples of these alloys and of similar alloys used hereinbefore are known as Nimonic 80, Nimonic 90, Nimonic 115, Rolls-Royce alloy C1047 and Waspalloy.

Particular examples of the application of the invention to the manufacture of turbine blades are as follows:

EXAMPLE I

Two blade halves were made by casting a nickel base alloy having the following composition:

| | Percent |
|---|---|
| Carbon | 0.1 |
| Chromium | 9.8 |
| Cobalt | 10.1 |
| Molybdenum | 4.1 |
| Titanium | 4.95 |
| Aluminum | 5.05 |
| Boron | 0.015 |
| Zirconium | 0.12 |
| Nickel | Balance |

The inner (adjacent) surfaces of the halves were then ground flat and slots were machined to act as cooling passages. The two halves were put one on top of the other and heated in a vacuum furnace at a pressure of less than $5 \times 10^{-5}$ torr for 20 hours at 1235° C. The solidus temperature of this alloy is 1240° C.

Solid state diffusion took place at the abutting face of the two parts, so as to make an integrated turbines blade with cooling passages formed in situ by the machined slots.

The integrity of the bond was assessed by tensile test bars machined from the blade.

TABLE I

| Specimens taken from— | Yield point, 0.1% tons/sq. in. | Ultimate strength, tons/sq. in. | Elong., percent |
|---|---|---|---|
| Solid part of blade tested at 1,000° C. | 26.5 | 27.5 | 3 |
| Across join of blade tested at 1,000° C. | 29.75 | 31.0 | 2 |

Further blades were made in the same way using wrought alloys and sintered alloys.

The integrity of the bond in each material was assessed by tensile tests and stress to rupture tests of test bars machined from the blades.

EXAMPLE II

A blade made from a wrought nickel base alloy having a solidus temperature of 1255° C., joined by heating in a vacuum furnace at a pressure less than $5 \times 10^{-5}$ torr for 20 hours at 1250° C., gave the following test results.

TABLE II

| Specimens taken from— | Yield point, 0.1% tons/sq. in. | Ultimate strength, tons/sq. in. | Elong., percent |
|---|---|---|---|
| Solid part of blade tested at RT | 49 | 73.25 | 30 |
| Solid part of blade tested at 1,000° C. | 23.5 | 27.25 | 15 |
| Across join of blade tested at RT | 47 | 52.75 | 2 |
| Across join of blade tested at 1,000° C. | 23.5 | 27.75 | 8 |

Stress to rupture tests at 7 tons/sq. in. and 980° C. gave the following results:

Solid part of blade 109.5 hrs. to rupture 24.8% elongation.

Across join of blade 70.2 hrs. to rupture 0.8% elongation.

The alloy used in this example had the following composition:

| | Percent |
|---|---|
| Carbon | 0.2 |
| Chromium | 11.5 |
| Cobalt | 16 |
| Molybdenum | 3.5 |
| Titanium | 4.65 |
| Aluminum | 5.72 |
| Boron | 0.025 |
| Zirconium | 0.037 |
| Nickel | Balance |

EXAMPLE III

A blade made from a sintered nickel base alloy joined by heating in a vacuum furnace at a pressure less than $5 \times 10^{-5}$ torr for 20 hours at 1235° C., gave the following test results:

TABLE III

| Specimens taken from— | Yield point, 0.1% tons/sq. in. | Ultimate strength, tons/sq. in. | Elong., percent |
|---|---|---|---|
| Solid part of blade tested at RT | 57 | 64.5 | 8 |
| Across join of blade tested at RT | 57 | 61 | 4 |

Stress to rupture tests at 7 tons/sq. in. and 980° /C. gave the following results.

Solid part of blade 32.9 hrs. to rupture 8.4% elongation.

Across join of blade 31.7 hrs. to rupture 4.4% elongation.

The alloy used in this example had a solidus temperature of 1245° C. and the following composition:

| | Percent |
|---|---|
| Carbon | 0.15 |
| Chromium | 14.8 |
| Cobalt | 15.1 |
| Molybdenum | 4.5 |
| Titanium | 3.8 |
| Aluminum | 5.1 |
| Boron | 0.055 |
| Zirconium | 0.17 |
| Nickel | Balance |

EXAMPLE IV

A wrought nickel base alloy was joined at various times and different temperature to determine the optimum time and temperature. The alloy used in the example had the following composition:

| | Percent |
|---|---|
| Carbon | 0.1 |
| Chromium | 15.5 |
| Cobalt | 15.2 |
| Molybdenum | 4 |
| Titanium | 4.2 |
| Aluminum | 5.05 |
| Boron | 0.025 |
| Zirconium | 0.04 |
| Nickel | Balance |

The integrity of the join was assessed metallo-graphically and by tensile tests across the join, and gave the following results:

(a) Joined at 1244° C. for various times in a vacuum furnace at a pressure less than $5 \times 10^{-5}$ torr. The solidus temperature of this alloy is 1245° C.

TABLE IV

| Time of join | Yield point, 0.1% tons/sq. in. | Ultimate strength, tons/sq. in. | Elongation, percent |
|---|---|---|---|
| 1 hour | 20 | 22.5 | 4 |
| 2 hours | 21.5 | 23.75 | 5 |
| 5 hours | 19.5 | 22.125 | 6 |
| 10 hours | 21.25 | 23.25 | 9 |
| 15 hours | 21 | 23 | 6 |
| 20 hours | 21.75 | 22.75 | 6 |

NOTE.—All specimens were tested at 1,000° C.

Metallographic examination of the joins showed them all to be complete, and that the specimens had been heated almost to the solidus temperature.

(b) Joined at 1235° C. for various times in vacuum furnace at a pressure less than $5 \times 10^{-5}$ torr, the following figures were obtained:

TABLE V

| Time of join | Yield point, 0.1% tons/sq. in. | Ultimate strength, tons/sq. in. | Elongation, percent |
|---|---|---|---|
| 2 hours | 19.5 | 21.25 | 4 |
| 5 hours | 6.75 | 6.75 | 1 |
| 10 hours | 20.25 | 23 | 5 |
| 20 hours | 20.75 | 23.5 | 4 |

All specimens were tested at 1000° C.

Metallographic examination of the joins showed the 2 hours and the 5 hour blocks to be incompletely joined, over about 50% of the block surface and it was fortuitous that the 2 hours tensile test piece was cut from a good portion. The other joins were satisfactory.

Improved results can be obtained by heat treatment of the metal parts in vacuum prior to the joining of the parts. This treatment consists of heating the individual parts for 15 to 60 minutes at between 5° and 20° below the solidus temperature of the alloy in a vacuum furnace at a pressure less than $5 \times 10^{-5}$ torr.

In a particular example involving the heat treatment, two turbine blades were made from a typical high temperature wrought nickel base alloy having a solidus temperature of 1265° C. and a composition essentially the same as the alloy employed in Example II.

The two blades marked A and B were joined by exactly the same method but the parts of blade B were sujected to heat treatment in a vacuum furnace of 1245° C. for ½ hour at a pressure less than $5 \times 10^{-5}$ torr and the parts of blade A were joined without the initial heat treatment. Mechanical tests were then performed on test pieces cut out of the two blades with the following results:

TABLE VI

| Specimens taken across joint of — | Yield point, 0.1% tons/sq. in. | Ultimate strength, tons/sq. in. | Elongation, percent |
|---|---|---|---|
| Blade A, tested at RT | 48.0 | 53.75 | 3.0 |
| Blade A, tested at RT | 50.0 | 54.50 | 2.5 |
| Blade A, tested at 1,000° C | 19.5 | 20.75 | 4.5 |
| Blade B, tested at RT | 49.0 | 71.25 | 20.5 |
| Blade B, tested at RT | 50.5 | 67.0 | 14.5 |
| Blade B, tested at 1,000° C | 20.25 | 22.65 | 8.5 |

It will be noted that the ductility of blade B was very much greater than that of blade A as seen from the elongation figures given in the results above. There was also a considerable improvement in ultimate strength although the yield point did not change appreciably.

It will be appreciated from the foregoing that, among the important aspects of the present invention, is the fact that nickel base alloy parts are employed and these parts are bonded by placing the same in abutting or mating relationship without the application of any significant external pressure or pressing together of the parts. In other words, the parts are simply brought together in mating relationship with minimal pressure suffficent only to hold the parts in place until the desired bond is formed by solid state diffusion. In order to avoid oxidation impurities, the bonding operation is also carried out in a vacuum or possibly a very low pressure argon atmosphere or other inert atmosphere. The use of the very low pressure or vacuum lowers the free surface energy of the alloys ond this helps to prevent any oxidation and also encourages the diffusion which is the mechanism by which the joint is achieved.

Because the parts to be bonded are simply laid together rather than being held together by the application of pressure, it will be appreciated that the present process offers the unique advantage of eliminating the need for expensive and complicated clamping. Jigging may only be necessary to maintain alignment prior to bonding. The absence of pressure avoids distortion and is particularly advantageous where small holes are present in avoiding distortion of these holes.

It will also be appreciated from the foregoing that preheating of the parts to be bonded also represents a unique and advantageous aspect of the present method. Other features and variations are also important as will be apparent from the following claims wherein:

We claim:

1. A method of joining together two nickel base alloy parts which comprises forming mating faces on the parts, heat treating the parts in vacuum at a temperature within 100° C. of the solidus temperature of the alloy, then bringing the parts together so that the mating faces are in direct contact, and subjecting the parts to a temperature which is below the solidus temperature of the alloy without the application of external pressure, for a long enough period of time to ensure that a permanent bond is formed between the two parts by solid state diffusion alone.

2. A method of joining together two nickel base alloy parts including the steps of machining or otherwise forming flat or curved mating surfaces on the two parts, heat treating the parts in vacuum at a temperature within 100° C. of the solidus temperature of the alloy, then bringing the flat or curved mating surfaces into direct contact with each other without the application of external pressure, and maintaining the temperature of the two parts between S—½° C. and S—15° (where S is the solidus temperature of the two parts or of an alloy formed from the two parts) for a length of time such as to result in a permanent bond being formed between the two parts by solid state diffusion only.

3. A method of making a turbine blade for a gas turbine engine in accordance with claim 2.

4. A method according to claim 3 and in which cooling passages are formed in the turbine blade.

5. A method of making a nickel base alloy gas turbine blade having cooling passages in it in which shaped slots are formed in a surface of at least one part of a nickel base alloy forging or blade, the surface or surfaces being chosen in the part to coincide with the position where passages are required internally in the blade, heat treating the parts in vacuum at a temperature wthin 100° C. of the solidus temperature of the alloy, then mating the surface of the part containing the shaped slots with the corresponding surface of another nickel base alloy part and joining the parts into a single piece by maintaining the parts at a temperature between S —½° C. and S —15° C. for a sufficient time to join the parts by solid state diffusion only.

6. A method according to claim 5 wherein the heat treatment consists of heating the individual parts to be joined for between 15 and 60 minutes.

7. A method according to claim 6 and in which the heat treatment is carried out in a vacuum furnace at pressure less than $5 \times 10^{-5}$ torr.

8. A method according to claim 5 in which the slots are formed in both mating parts.

9. A method according to claim 2 in which the parts are maintained at said temperature for a time within the range of 2 to 24 hours in the final joining step.

10. A method according to claim 5 and in which the final joining step is carried out in a vacuum furnace.

11. A method according to claim 5 in which blade parts to be joined are formed by powder metallurgy methods.

12. A method according to claim 11 and in which the parts are formed by pressing each of two or more sections in dies to form the required cooling passages and then sintering.

13. A method of making a gas turbine blade comprising casting two half blade portions of a nickel base alloy, grinding flat the surfaces of the halves which are to be brought together, machining slots in said surfaces, heat treating the halves in vacuum at a temperature within 100° C. of the solidus temperature of the alloy, then placing the halves on top of one another so that they are in direct contact with each other without the application of external pressure and heating in a vacuum furnace at a pressure of less than $5 \times 10^{-5}$ torr for 20 hours at 1235° C., the solidus temperature of the alloy being 1240° C.

References Cited

UNITED STATES PATENTS

| | | | |
|---|---|---|---|
| 2,807,437 | 9/1957 | Roush | 29—156.8HX |
| 3,055,096 | 9/1962 | Bertossa | 29—504X |
| 3,088,192 | 5/1963 | Turner | 29—498X |
| 3,197,858 | 8/1965 | Feduska et al. | 29—498X |

JOHN F. CAMPBELL, Primary Examiner

R. J. SHORE, Assistant Examiner

U.S. Cl. X.R.

29—156.8(H), 498, 504